United States Patent [19]

Stevenson

[11] Patent Number: 4,824,306
[45] Date of Patent: Apr. 25, 1989

[54] COLLATING APPARATUS AND METHOD

[75] Inventor: Clarence L. Stevenson, Saint Helena, Calif.

[73] Assignee: Colmac, Inc., Napa, Calif.

[21] Appl. No.: 869,360

[22] Filed: Jun. 2, 1986

[51] Int. Cl.⁴ .................. B65G 57/10; B65G 60/00
[52] U.S. Cl. .................. 414/788.4; 221/95; 221/112; 414/786; 414/789.6; 414/794.7; 414/797.9
[58] Field of Search .................. 198/420, 421, 422; 221/93, 95, 112; 414/32, 41, 89, 131, 786, 29

[56] References Cited

U.S. PATENT DOCUMENTS

| | | | |
|---|---|---|---|
| 2,781,887 | 2/1957 | Forster | 198/422 X |
| 2,853,177 | 9/1958 | Engleson et al. | 198/421 |
| 3,106,315 | 10/1963 | Bailey | 221/93 |
| 3,220,158 | 11/1965 | Roser et al. | 414/89 X |
| 3,288,331 | 11/1966 | Mazurkivich | 221/93 X |
| 4,068,766 | 1/1978 | Schmitt | 198/420 X |
| 4,397,599 | 8/1983 | Sabel | 414/98 X |

FOREIGN PATENT DOCUMENTS 431081 4/1975 U.S.S.R. .................. 414/51

Primary Examiner—Robert J. Spar
Assistant Examiner—Janice Krizek
Attorney, Agent, or Firm—Douglas E. White

[57] ABSTRACT

In a stacking apparatus of the type having tines for pushing one workpiece each out of the bottoms of a plurality of aligned reservoirs, an improvement is disclosed which comprises a ramp adjacent to the reservoirs and inclined with respect to the bottom line of the reservoirs for stacking the workpieces in stacks of increasing height.

15 Claims, 3 Drawing Sheets

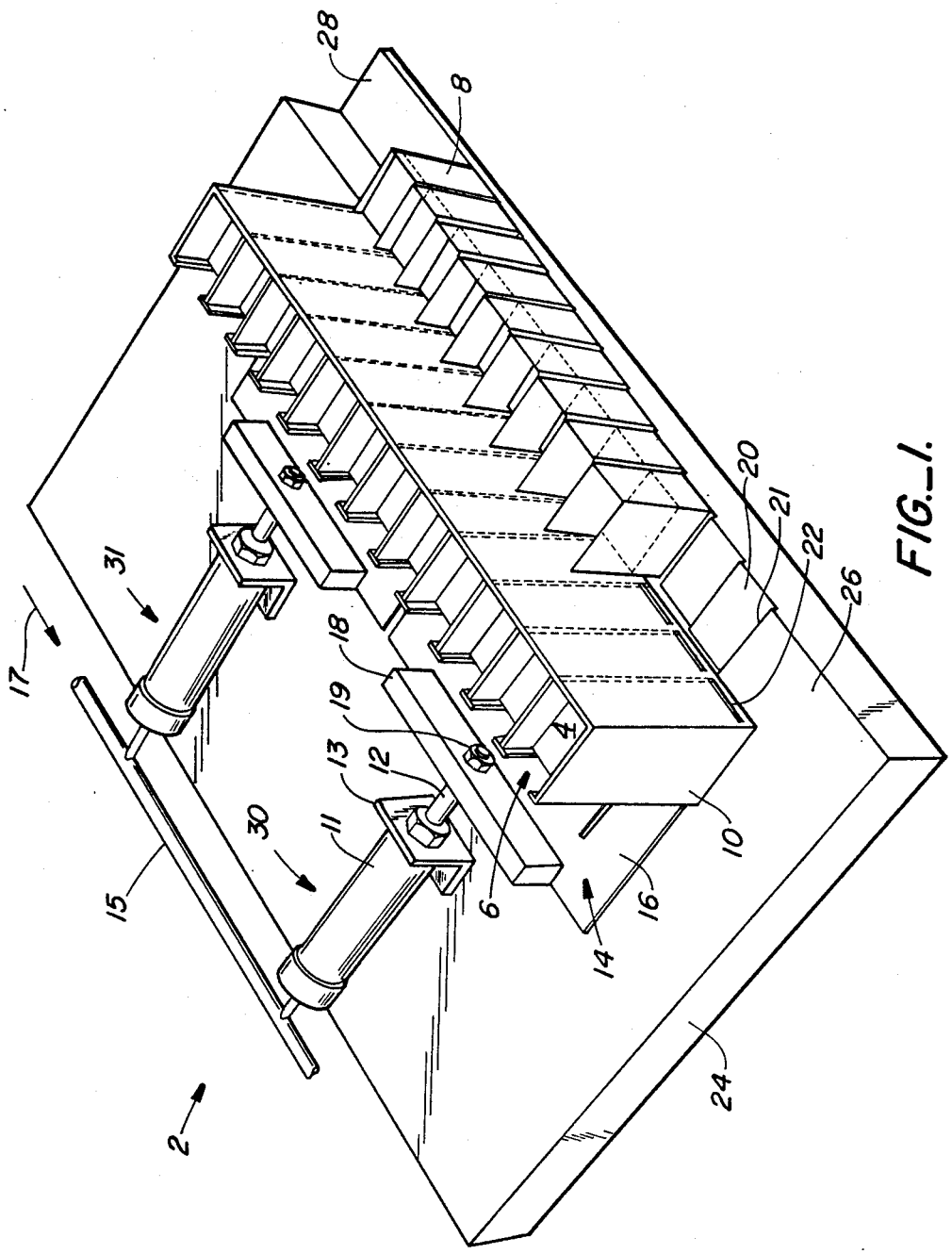

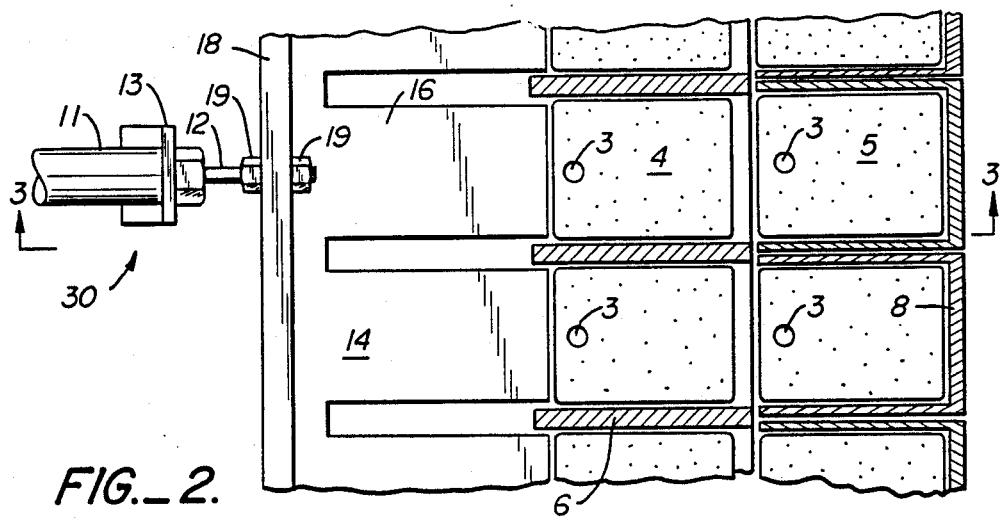
FIG._2.
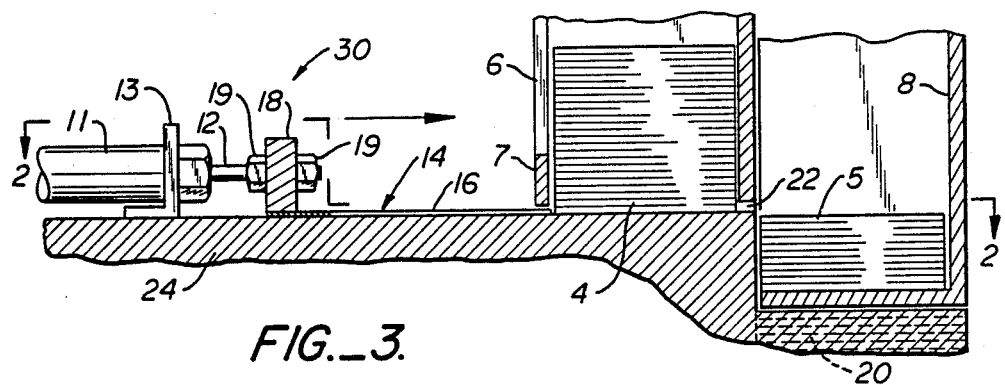
FIG._3.
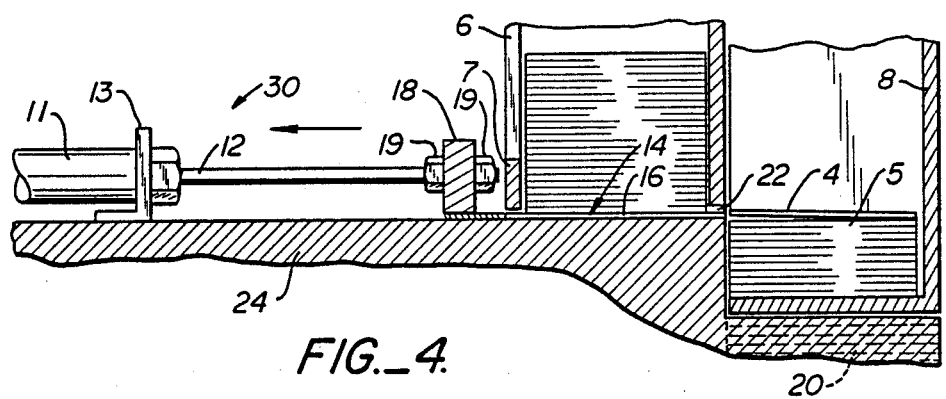
FIG._4.

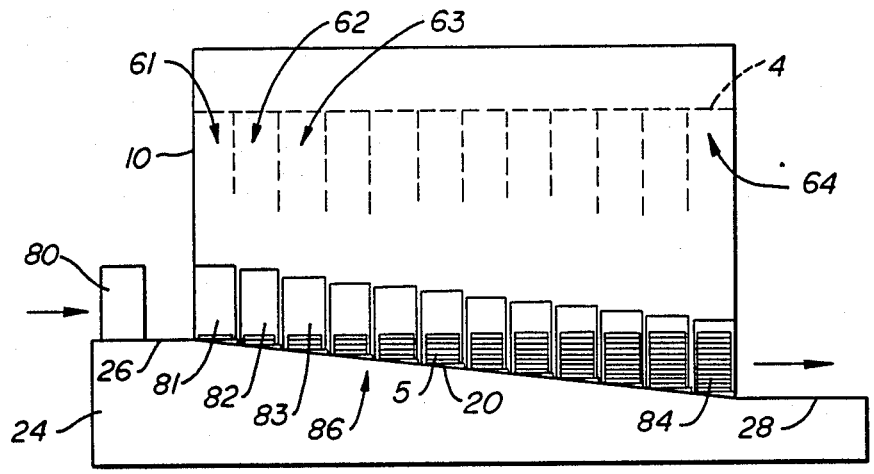
FIG._5.
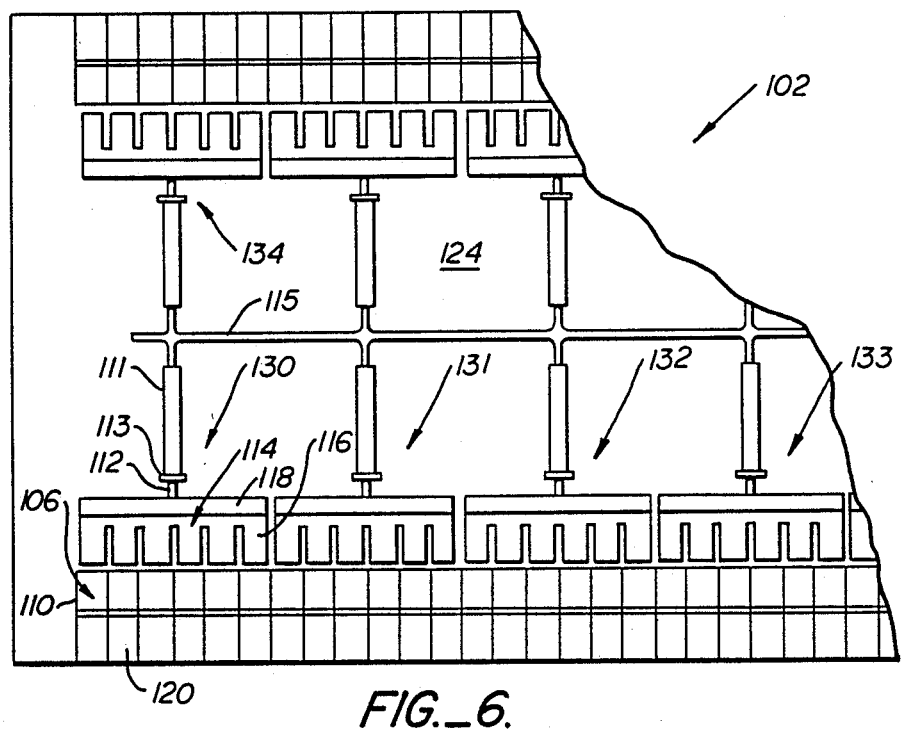
FIG._6.

COLLATING APPARATUS AND METHOD

FIELD OF THE INVENTION

This invention relates to automatic machinery for sorting and stacking planar workpieces - more particularly, to apparatus for collating laminated plastic sample chips.

BACKGROUND OF THE INVENTION

Laminated plastic building material, such as that available under the trademark FORMICA, is usually sold in large sheets, four feet by eight feet being one common size. In view of the difficulty purchasers have in perusing through selections of such sheets, which may be available in hundreds of different colors and patterns, laminated plastic is commonly selected for purchase through the use of chain loops of small samples ("chips") of the available stock.

Sample chip loops are compact and lightweight. They are cheaply transportable by the manufacturer, easily restocked with new selections and can be taken home by the prospective purchaser for on-site comparison with the intended decor. Insofar as stock may be ordered for delivery from the manufacturer or from a central warehouse through the use of stock numbers printed on the chips, such sample loops can reduce the need for the retailer to keep a complete stock of expensive inventory.

Chip loops consist of scores of small pieces of laminated plastic, each typically about 2 inches by 3 inches, through which a conventional ball link chain (key chain) passes. The prior art method of assembling such loops has been to manually select one chip at a time from consecutive bins each containing chips of like color, pattern, composition or the like. Each succeeding chip is placed on top of the last, forming a collated stack of differing color, pattern, etc.

Each chip is pierced by a round hole of significantly greater diameter than the balls of the ball link chain. The loop is assembled by dropping the chain through the cylindrically aligned holes of the stack, lifting the stack and then securing the ends of the chain together.

U.S. Pat. No. 2,872,020 to O. Hansel et al. teaches a stacking apparatus for planar objects which could be converted for limited use to automatically form laminate plastic sample chip stacks. However, the Hansel apparatus is only capable of forming stacks of a height which is limited by the height of vertical tines—the stack can be no higher than the tines, whose height is in turn limited by the torque which a revolving conveyor chain can support. Thus, there is a need in the art for an automatic stacking apparatus which can collate and stack scores, if not hundreds, of laminate chips for forming into sample loops.

SUMMARY OF THE INVENTION

The present invention is an improvement in a stacking apparatus of the type having tines for pushing one workpiece each out of the bottoms of a plurality of aligned reservoirs which comprises ramp means adjacent to the reservoirs and inclined with respect to the bottom line of the reservoirs for stacking the workpieces in stacks of increasing height.

FEATURES AND ADVANTAGES

An object of this invention is to provide an automatic stacking apparatus which can collate and stack laminate plastic sample chips for forming into loops for use by customers in the selection of laminate plastic sheets for purchase. This is accomplished by an apparatus which uses a fork-like tine of a plate containing a plurality of such tines to push a chip from the bottom of a reservoir onto the top of a chip stack in a receiver container.

Another object of the present invention is to provide a collating apparatus which can form stacks of very large height—stacks of up to at least 48 chips in height, which stacks can be combined to form stacks of even greater height. Banks of the chip reservoirs can be sequentially arranged in a line and in the present mechanism the height (number of chips) of the chip stacks is not limited by the length of the tines. Theoretically, it is not limited at all—for each new color or pattern of chip, a new reservoir can be added to the line.

Receivers can be half filled by one bank of reservoirs and then transported to a second bank for completion of collation. Alternatively, one set of stacks of a certain height can be formed and set aside. The reservoirs can then be filled with different chips and a second set of stacks formed. The two stack sets can then be combined to form a set of stacks of double height.

Yet another object is to be able to form multiple collated stacks in continuous succession. A plurality of chip receivers passes by the reservoirs of the instant apparatus. The number of stacks is limited only by the supply of chips in the reservoirs, which supply can be continuously refreshed.

Yet another advantage of the present invention is that the chip receivers are independent modules which can be transported, manually or by separate apparatus, to a working area for insertion of the chain loop. The receivers are shaped to form an even stack with aligned chain holes and to keep the stack stable in the desired shape during movement of the stack.

Still another advantage is that the sequence of chips within the formed loop can be varied merely by selecting the order of chip lots as they are placed within the reservoirs.

Other novel features which are characteristic of the invention, as to organization and method of operation, together with further objects and advantages thereof will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWING

FIG. 1 is a perspective view of the collating apparatus of the present invention showing two injectors;

FIG. 2 is a sectional view of the collating apparatus of FIG. 1 taken along line 2—2 of FIG. 3, showing a portion of an injector and two reservoir bottoms;

FIG. 3 is a sectional view of the collating apparatus of FIG. 2 taken along line 3—3 of FIG. 2;

FIG. 4 is a sectional view of the collating apparatus of FIG. 3 showing the injector in a second position;

FIG. 5 is a schematic plan view of the collating apparatus of FIG. 1; and

FIG. 6 is a part schematic, part sectional view of a collating apparatus of which the apparatus of FIG. 1 forms one portion.

DESCRIPTION OF THE PREFERRED EMBODIMENT

Referring to FIG. 1, there is shown therein a collating apparatus generally designated as 2. In this embodiment there are illustrated two injectors 30,31. In another preferred embodiment wherein a chain loop of chip samples of more than twelve chips is desired, additional injectors may be added, both in line with injectors 30,31 and directly opposite them.

The embodiment illustrated will be described with respect to the operation of injector 30. The parts of injector 31 and any additional injectors are identical in form and function.

Injector 30 comprises an air cylinder 11 which translates pneumatic piston 12 as air 17 is introduced or removed from air line 15. Piston 12 is connected to plate 14 by fitting 18. Fitting 18 is welded or otherwise affixed to plate 14. A threaded end of piston 12 is secured to fitting 18 by nut 19, but other equivalent methods of securing piston 12 to plate 14 may easily be devised.

Plate 14 has projecting fork-like planar tines 16 which are inserted into the bottom of dispenser 10. Dispenser 10 consists of a row of at least six vertically and horizontally aligned hoppers or chip reservoirs 6. The shape of the tines 16 (rectangular) is the same as that of the cross-section of the interior of the reservoirs 6, but the size of the tines 16 is slightly smaller in order to allow easy ingress and egress of the tines to the reservoirs 6. Reservoirs 6 are each filled with chips 4. While the chips 4 in any one reservoir 6 are all of one identical color, pattern or composition, each separate reservoir 6 holds chips 4 of a different color, etc. than the others.

It is desired to distribute the chips initially stacked by single attribute in the reservoirs 6 into stacks 5 of chips which contain one chip from each reservoir, i.e. are collated into stacks where no two chips are of identical attribute. This is accomplished by tines 16 of plate 14 which push chips 4 out of the bottoms of reservoirs 6 one at a time into a line of awaiting receivers 8.

Receivers 8 are orthogonal sextahedrons having an open top for unloading collated chips 5 and one open side for receiving uncollated chips 4 from the reservoirs 6. Receivers 8 are of a height at least equal to that of the maximum stack 5 obtainable from the number of reservoirs 6 in the dispenser 10. In FIG. 1 that stack is twelve chips in height, resulting from one chip from each of the twelve reservoirs 6. An effective apparatus may be built containing 96 reservoirs, and a section of such a machine is shown in FIG. 6.

Injector 30 is mounted on a housing or platform 24 by bracket 13. Platform 24 has twelve steps 20 descending in a straight line immediately in front of the face of dispenser 10. Each step 20 is lower that its predecessor by a height at least equal to the thickness of a standard laminate chip sample 4. In other words, the risers 21 of steps 20 each equal the height of a chip 4. An optional staging area 26 may be located on the platform 24 adjacent the dispenser 10 and before the first step 20. A similar optional holding area 28 for full receivers 8 may be located at the end of the step ramp of the platform 24. A conveyor belt containing descending platforms of height equal to a chip 4 may be substituted for the fixed "stairway" of steps 20 illustrated in FIG. 1.

FIG. 1 shows the first three steps 20 empty, for purposes of illustrating the location and configuration of slots 22 and steps 20. Slots 22 are aligned across the face of dispenser 10 and are of a shape and size which will allow the passage of only one chip 4 at a time from each reservoir 6 into an associated receiver, one of which is located opposite each slot 22 on each step 20 during actual operation.

Referring to FIG. 2, there is shown therein a top view in partial section of the collating apparatus 2 of FIG. 1. Piston 12 is retracted into cylinder 11 and tines 16 of plate 14 are nearly completely removed from the reservoir bays 6. Chip 4 shown in FIG. 2 is the lowermost chip in the stack in the reservoir 6. Also shown in FIG. 2 is the round aperture or hole 3 which pierces chips 4 and is used to insert a ball link chain (not illustrated) in the final stage of assembly of a chip sample loop.

The position shown in the top view of FIG. 2 is repeated in the side view of FIG. 3 and represents the position of the injector 30 preparatory to injecting bottom chip 4 through slot 22 onto the top of chip stack 5. An increase in pressure of air 17 will cause piston 12 to move from the position shown in FIG. 3 to that shown in FIG. 4. The piston 12 then extends outwardly from cylinder 11 and moves tine 16 of plate 14 into reservoir 6. Tine 16 contacts lowermost chip 4 and ejects it onto the top of stack 5 of the receiver 8 which is at that point in time opposite the reservoir 6 illustrated in FIGS. 3 and 4. The restricted height of slot 22 ensures that only one chip exits a reservoir per piston stroke. To complete the stroke, piston 12 retracts back into its cylinder 11 and is ready for the next cycle. Piston 12 can be made to retract either by the application of a vacuum or through use of a spring loaded cylinder 11 which automatically retracts when air pressure is reduced below the point required to overcome the spring's resistance.

The complete cycle of operation of collating apparatus 2 can be explained with reference to FIG. 5 in addition to the figures of the drawings already mentioned. Prior to automatic operation, the apparatus 2 must be primed as follows. An empty receiver 81 is placed on the first step 20 of inclined receiver ramp 86 opposite the first reservoir 61 of dispenser hopper 10 (note that receiver 81 is not shown empty in FIG. 5 because that figure illustrates the status following the first stroke). A single chip of the type contained in the first reservoir 61 is placed in a second receiver 82 and receiver 82 is placed in position on ramp 86 opposite the second reservoir 62. A chip of the type contained in the first reservoir 61 is placed on the bottom of a third receiver 83 and a chip of the type contained in the second reservoir 62 is placed on top of this bottom chip. Third receiver 83 is then placed on the step corresponding to third reservoir 63. Loading of the remaining receivers proceeds in the same manner, i.e. each receiver is given a stack containing chips of types from all preceding reservoirs, but is not given a chip from the reservoir opposite from which it is to be placed prior to the start of automatic operation. In this manner, final receiver 84, number twelve in the embodiment illustrated in FIG. 5, is primed with chips of the types found in the eleven preceding reservoirs, is placed opposite the last (twelfth) reservoir 64, and is ready to receive a chip from its associated reservoir, as are all of the other receivers 81,82,83 . . .

The apparatus is activated by the first pump of air, causing one chip per receiver to be ejected simultaneously into the twelve receivers 81,82,83...84. FIG. 5 illustrates the status of the receivers immediately following this first stroke. At this point, an empty receiver 80 is introduced from staging area 26 of platform 24 by pushing it, either manually or through automatic operation, against receiver 81. This forces receiver 81 to drop down a step 20 on ramp 86 into position opposite reservoir 62, receiver 82 to drop opposite reservoir 63 and so on. Receiver 84, now full, is forced onto the holding area 28, from where it may be removed for assembly elsewhere into a chip sample loop. The stack 5 of chips thus collated in final receiver 84 is removed, a ball link chain inserted in the aligned apertures 3 of the chip stack and the ends of the chain linked together in the manner known in the art (not illustrated).

FIG. 6 is a sectional view of another preferred embodiment 102 of the invention in which a battery of sixteen or more injectors 130,131,132,133,134 . . . may be assembled on platform 124. In this embodiment, no staging area is provided. Injector 130 is comprised of cylinder 111, piston 112, bracket 113, plate 114, six tines 116 and fitting 118. Tines 116 feed into reservoirs 106 of dispenser 110. Steps 120 are provided for individual receivers (not illustrated). Injectors 131,132, . . . are similarly configures and operate in the manner previously described. An important feature in the operation of collating apparatus 102 is that injector 130 is opposite and its center line is aligned with the center line of injector 134, both perpendicular to the axis of air line 115, and all other injectors 131,132,133 . . . are similarly paired. In this manner, each stroke of a piston, e.g. piston 112 of injector 130, is counterbalanced by a simultaneous opposing stroke of the piston of the paired injector, e.g. injector 134. Torque forces, which otherwise might stress and eventually fracture tube 115 are thus avoided. Once a receiver has passed by all the reservoirs 130,131 . . . of the first row, it is carried to the beginning of the second opposite row where it is filled by reservoirs 134 . . . to complete the collation.

While the above provides a full and complete disclosure of the preferred embodiments of the invention, various modifications, alternate constructions, and equivalents may be employed without departing from the true spirit and scope of the invention. Therefore, the above description and illustrations should not be construed as limiting the scope of the invention which is defined by the appended claims.

I claim:

1. A laminate plastic chip workpiece sorting and stacking apparatus including:
   a plurality of aligned vertical reservoirs; tines for ejecting one chip workpiece out of each of the bottoms of the vertical reservoirs;
   ramp means adjacent to the reservoirs and inclined with respect to a substantially horizontal bottom line of the reservoirs for stacking the workpieces in vertical stacks of increasing height;
   a plurality of orthogonal sextahedrons on the ramp means each having an open top and one open side for enclosing the vertical stacks of workpieces; and
   the reservoirs having at least three workpiece encapsulating walls extending upwardly from the bottom line of the reservoirs for temporarily fixedly storing a multiplicity of uncollated workpieces.

2. A laminate plastic chip workpiece sorting and stacking apparatus including:
   a plurality of aligned vertical reservoirs; tines for ejecting one chip workpiece out of each of the bottoms of the vertical reservoirs;
   a stairway adjacent to the reservoirs and inclined with respect to a substantially horizontal bottom line of the reservoirs for stacking the workpieces in vertical stacks of increasing height;
   receiver means on the stairway for enclosing the vertical stacks of workpieces;
   a plurality of steps on the stairway, the steps having risers of height at least equal to the height of the workpieces, wherein the workpieces are stacked in the receiver means in stacks whose height increases by the height of one workpiece per step;
   the reservoirs having at least three workpiece encapsulating walls extending upwardly from the bottom line of the reservoirs for temporarily fixedly storing a multiplicity of uncollated workpieces;
   a slot in the bottom of each reservoir aligned with the horizontal bottom line of the reservoirs; and
   pneumatic means for pushing the tines against the workpieces in the bottoms of the reservoirs, whereby one workpiece per reservoir is ejected from each slot.

3. The stacking apparatus of claim 2 wherein the pneumatic means is
   at least one pneumatic piston in a pneumatic cylinder, the piston being connected to a plurality of the plurality of tines.

4. The stacking apparatus of claim 3 wherein the tines are planar and the piston is connected to the tines by
   a plate, the plate and tines forming the shape of a fork.

5. A stacking and collating apparatus for planar workpieces comprising:
   a platform frame;
   at least six vertical reservoirs for the workpieces aligned
   in a row on the frame, the row of reservoirs having
      a first side and a second side opposite the first side, the first side having
         a slot at the bottom of each reservoir, the slots aligned on a center line parallel with the plane of the frame, the first and second sides configured to temporarily fixedly store a multiplicity of uncollated workpieces;
   at least one plate, the plate having
      a plurality of planar tines extending from a first end of the plate, one tine inserted in slidable engagement in the bottom of each of the reservoirs through an opening in the second side of the row of reservoirs;
   means for slidably engaging and disengaging the tines with the interiors of the reservoirs, whereby the tines discharge workpieces through the slots;
   a plurality of receiver containers for the workpieces; and ramp means inclined at an angle and extending downwardly with respect to the center line of the slots and the plane of the platform frame and adjacent to the first side of the row of reservoirs for aligning the receiver containers in descending order adjacent to the slots.

6. The apparatus of claim 5 wherein the means for slidably engaging and disengaging the tines with the interiors of the reservoirs is
   at least one pneumatic piston in at least one pneumatic cylinder, the piston being connected to the at least one plate at a second end of the plate opposite the tines of the first end of the plate, whereby air fed to the cylinder causes the tines to engage with the reservoirs and eject one workpiece per reservoir through the slot of the reservoir into the receiver container adjacent to the reservoir.

7. The apparatus of claim 6, wherein the ramp means is an inclined stairway.

8. The apparatus of claim 7, wherein the stairway has a plurality of steps, the steps having risers of height at least equal to the height of a workpiece, wherein the workpieces are stacked in the receiver containers in stacks whose height increases sequentially by the height of one workpiece per step.

9. The apparatus of claim 8, wherein there are 16 pistons connected to 16 plates, each plate having 6 tines, for a total of 96 tines engaged in 96 reservoirs.

10. The apparatus of claim 9, wherein eight of the pistons have their axes in line with axes of the other eight pistons, forming eight pairs of directly opposing pistons, whereby air supplied to the cylinders of the pistons does not create torque forces.

11. The apparatus of claim 10, wherein the workpieces are laminated plastic chip samples.

12. A method of stacking and collating laminated plastic sample chips, including the steps of:
   providing a plurality of reservoirs aligned first reservoir to last reservoir from left to right, respectively, each reservoir having a slot in the bottom thereof, the slots aligned on a center line;
   filling each reservoir with chips of a single characteristic to be collated, each reservoir being filled with chips of a different characteristic;
   providing descending ramp means inclined with respect to the center line of and adjacent to the slots;
   placing a plurality of receivers for the chips aligned first receiver to last receiver from left to right, respectively, on the ramp means so that each succeeding receiver is removed from the center line of the slots when compared to the adjacent preceding receiver by at least the height of one chip and each receiver is adjacent to a slot;
   priming each receiver with one chip from each reservoir to the left of, but not including, the reservoir opposite the receiver being primed;
   providing ejection means for simultaneously ejecting one chip from each reservoir through the slots into the receivers opposite the reservoirs;
   ejecting one chip from each reservoir through use of the ejection means thereby filling the last receiver;
   removing the full last receiver from its position adjacent the last reservoir; pushing the receivers down the ramp means to the right, each receiver being advanced one reservoir to the right; and adding an empty receiver on the ramp means adjacent the first reservoir to the left thereof.

13. The method of claim 12 wherein the ramp means is an inclined stairway and further including the step of providing the stairway with risers whose height at least equals the height of a workpiece.

14. The method of claim 13 wherein the ejection means is at least one pneumatic piston.

15. The method of claim 14 wherein 96 reservoirs are provided.

* * * * *